C. A. VANDERVELL & A. H. MIDGLEY.
SELF REGULATING DYNAMO ELECTRIC MACHINE.
APPLICATION FILED MAY 17, 1912.

1,086,486.

Patented Feb. 10, 1914.

WITNESSES

INVENTORS:
Charles Anthony Vandervell
Albert Henry Midgley

BY

ATTORNEY

UNITED STATES PATENT OFFICE.

CHARLES ANTHONY VANDERVELL AND ALBERT HENRY MIDGLEY, OF ACTON VALE, ENGLAND.

SELF-REGULATING DYNAMO-ELECTRIC MACHINE.

1,086,486.  Specification of Letters Patent.  Patented Feb. 10, 1914.

Original application filed October 30, 1911, Serial No. 657,635. Divided and this application filed May 17, 1912. Serial No. 697,900.

*To all whom it may concern:*

Be it known that we, CHARLES ANTHONY VANDERVELL and ALBERT HENRY MIDGLEY, both subjects of the King of Great Britain and Ireland, and residing at Warple Way, Acton Vale, in the county of Middlesex, England, have invented certain new and useful Improvements in and Relating to Self-Regulating Dynamo-Electric Machines, of which the following is a specification.

The invention relates to a variable speed and self-regulating dynamo electric machine in which the out-put and voltage is maintained practically constant within very narrow limits through a wide range of speed.

The invention is particularly applicable to dynamo electric machines used for the purpose of train lighting and car lighting in conjunction with a battery of accumulators.

The machine constructed according to the present invention comprises ordinary poles provided with shunt windings or with windings which are excited from an external source of constant potential supplementary poles which are unwound and two pairs of brushes arranged between the ordinary and supplementary poles and individually short-circuiting armature conductors which are not under the influence of the supplementary poles, each two brushes being directly connected together so as to short-circuit the armature conductors lying between them under the supplementary poles. Instead of directly connecting together each two brushes arranged on both sides of the unwound supplementary poles, they may be connected together through an adjustable resistance in order to reduce the short-circuited current.

Figure 1:
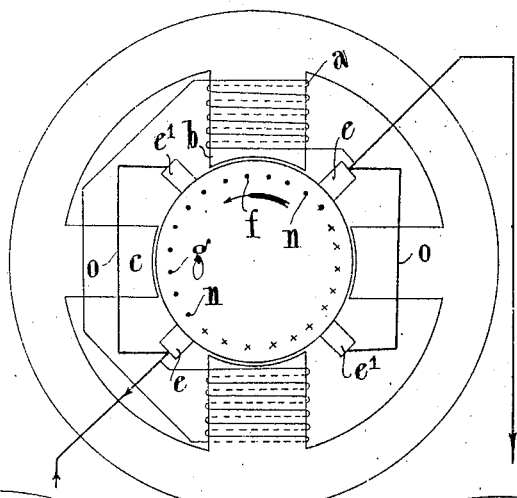
Figure 2:
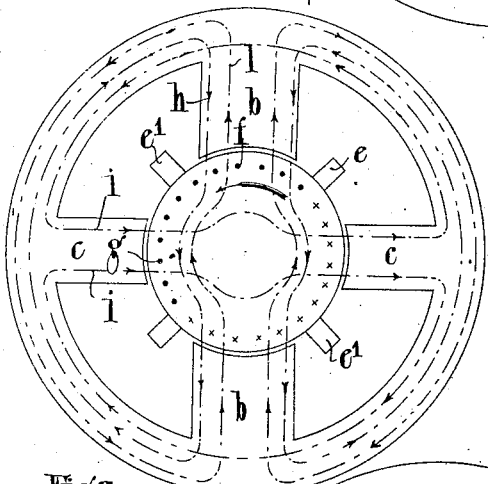
Figure 3:
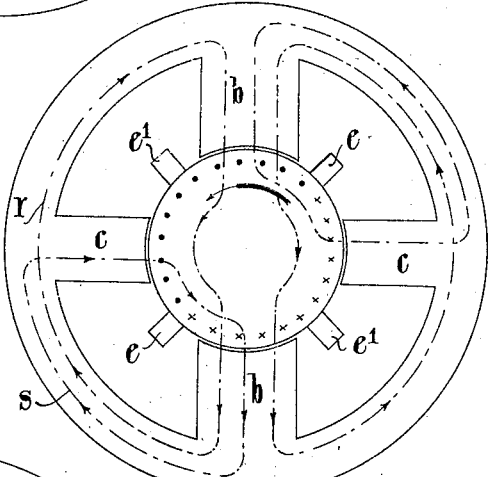
Figure 4:
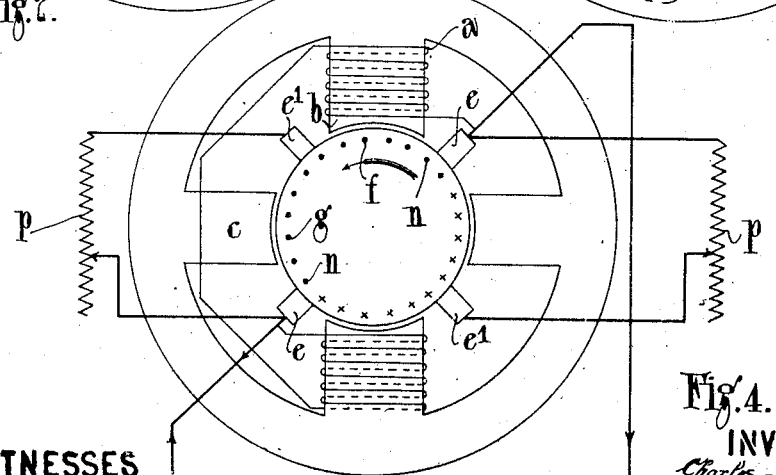

In the accompanying drawings, Figure 1 is a diagrammatic representation of the machine which is not reversible in action unless the brushes are rocked from one position to another in the usual way. Fig. 2 is a diagrammatic representation of the paths of the magnetic fluxes due to each magnetizing force separately in the machine, shown in Fig. 1, and Fig. 3 is a diagrammatic representation of the paths of the resultant magnetic fluxes in the machine due to the various magnetizing forces, as shown in Fig. 2. Fig. 4 is a diagrammatic representation of a modification.

Referring to Fig. 1, the machine comprises ordinary poles $b$ provided with shunt windings $a$ connected to the brushes $e$ (or equivalently they may be separately excited from an external source of constant potential), supplementary poles $c$ which are not wound and brushes $e'$, the brushes $e$ and $e'$ being arranged to individually short-circuit armature conductors which are not under the magnetic influence of the supplementary poles $c$. Each brush $e$ arranged at the one side of the supplementary pole $c$ is connected to the brush $e'$ arranged at the other side of the same supplementary pole by means of a connection $o$ whereby all the conductors between the said brushes $e$ and $e'$ are short-circuited.

Referring to Fig. 2, it will be seen that the flux due to the windings $a$ is represented by the chain lines $h$, the flux due to the conductors $f$ lying under the ordinary poles $b$ by the chain lines $i$, and the flux due to the current in the armature conductors $g$ under the supplementary poles $c$ by the chain lines $l$, the direction of the flow in each case being indicated by the arrows. The flux $h$ must be of higher value than the flux $l$ in order to produce the working current of the machine.

Referring to Fig. 3 it will be seen that the resultant effect of the various magnetizing forces shown in Fig. 2 is to produce the magnetic flux $r$ which passes through the ordinary poles and a small cross magnetic flux $s$ which passes through the supplementary poles $c$ and the main poles $b$.

The self regulating properties of the machine are due to the demagnetizing action of the flux $l$ produced by the current which flows in the short-circuited armature conductors $g$ lying under the supplementary poles $c$ between the brushes $e$ and $e'$ which short-circuited current is induced in the said conductors by the cross flux $i$ produced by the current flowing through the armature conductors $f$ under the ordinary poles $b$. It will be seen that as the current flowing through the conductors $f$ increases the cross flux $i$ thereby produced is also increased, the consequence being that the short-circuited current flowing through the armature conductors $g$ and also the flux opposing the main field are increased.

In order to reduce the amount of current flowing through the armature conductors $g$ and thereby increase the working current produced by the machine, we may insert an adjustable resistance $p$ in the conductor $o$ as shown in Fig. 4.

We have described our invention in relation to a two-pole machine, but we may use any number of poles; also in multi-polar machines we may use a series wound armature having less brushes than the number of poles. This is common practice for large machines.

This application is a division of our application Serial No. 657635 filed October 30th, 1911.

Having now described our invention what we claim as new and desire to secure by Letters Patent is:—

A variable speed dynamo electric machine comprising in combination an armature, armature conductors, a magnetic field system having ordinary poles and unwound supplementary poles, a brush arranged between each ordinary and each supplementary pole, and a short-circuit connection between each two brushes adjacent to each supplementary pole, whereby the armature conductors under the unwound supplementary poles are short-circuited in series with one another and the current flowing through these short-circuited armature conductors produces a flux in opposition to the field of the ordinary poles, as set forth.

In testimony whereof we have signed our names to this specification in the presence of two subscribing witnesses.

CHARLES ANTHONY VANDERVELL.
ALBERT HENRY MIDGLEY.

Witnesses:
BERTRAM H. MATTHEWS,
WALTER J. SKERTEN.

Copies of this patent may be obtained for five cents each, by addressing the "Commissioner of Patents, Washington, D. C."